US010737330B2

United States Patent
Schwab et al.

(10) Patent No.: US 10,737,330 B2
(45) Date of Patent: Aug. 11, 2020

(54) MATERIAL ROD FEEDING DEVICE

(71) Applicant: FMB Maschinenbau-gesellschaft mbH & Co. KG, Faulbach (DE)

(72) Inventors: Steffen Schwab, Altenbuch (DE); Andreas Schwab, Elsenfeld (DE); Kai Löffler, Erlenbach am Main (DE)

(73) Assignee: FMB Maschinenbau-gesellschaft mbH & Co. KG, Faulbach (DE)

( * ) Notice: Subject to any disclaimer, the term of this patent is extended or adjusted under 35 U.S.C. 154(b) by 0 days.

(21) Appl. No.: 16/130,869

(22) Filed: Sep. 13, 2018

(65) Prior Publication Data
US 2019/0084050 A1    Mar. 21, 2019

(30) Foreign Application Priority Data
Sep. 15, 2017 (EP) .................................. 17191474

(51) Int. Cl.
*B23B 13/10* (2006.01)
*B23Q 7/10* (2006.01)
(Continued)

(52) U.S. Cl.
CPC .............. *B23B 13/10* (2013.01); *B23B 13/02* (2013.01); *B23Q 7/106* (2013.01); *B21D 43/006* (2013.01); *B23Q 2240/007* (2013.01)

(58) Field of Classification Search
CPC ....... B21D 43/006; B23B 13/10; B23B 13/02; B23Q 2240/007; B23Q 7/106
See application file for complete search history.

(56) References Cited

U.S. PATENT DOCUMENTS 4,311,031 A * 1/1982 Schwarze ............ B21D 43/006
414/223.02
5,366,334 A * 11/1994 Cucchi ................... B23B 13/02
414/15
(Continued)

FOREIGN PATENT DOCUMENTS

EP    0212077 A2    3/1987
EP    1990129 A1    11/2008
(Continued)

OTHER PUBLICATIONS

Search Report issued in European patent application No. 17191474, dated Mar. 28, 2018.

*Primary Examiner* — Sara Addisu
(74) *Attorney, Agent, or Firm* — Kaplan Breyer Schwarz, LLP

(57) ABSTRACT

A material rod feeding device for feeding material rods to a machine tool, includes a magazine for stocking the material rods and a guide means into which material rods to be processed can be fed from the magazine, one at a time. The feeding direction of a material rod from the magazine into the guide means, is transversely to the longitudinal axis of the material rod in the guide means. The guide means includes a support leg and an abutment leg for providing a variably modifiable receiving channel. The support leg provides a support surface of the receiving channel that is inclined in the feeding direction and relative to the horizontal. The abutment leg is movable along the inclination relative to the support leg, so that the variably modifiable receiving channel is formed between the two legs, into which the material rod to be processed can be fed onto the support surface. The support leg together with the abutment leg is vertically movable as a whole.

14 Claims, 5 Drawing Sheets

(51) Int. Cl.
    *B23B 13/02*     (2006.01)
    *B21D 43/00*     (2006.01)

(56) References Cited

U.S. PATENT DOCUMENTS

| | | | | |
|---|---|---|---|---|
| 5,617,908 | A * | 4/1997 | Toogood | B27G 13/12 |
| | | | | 144/218 |
| 2006/0153666 | A1* | 7/2006 | Hirosawa | B23B 13/02 |
| | | | | 414/14 |
| 2009/0064830 | A1* | 3/2009 | Geiser | B23B 13/02 |
| | | | | 82/124 |
| 2009/0180856 | A1* | 7/2009 | Hirosawa | B23B 13/02 |
| | | | | 414/745.1 |
| 2011/0274520 | A1* | 11/2011 | Rigolone | B23B 13/02 |
| | | | | 414/222.01 |

FOREIGN PATENT DOCUMENTS

| | | |
|---|---|---|
| EP | 2316611 A1 | 5/2011 |
| EP | 2364801 A1 | 9/2011 |
| JP | 2007-276102 A | 10/2007 |

\* cited by examiner

MATERIAL ROD FEEDING DEVICE

CROSS-REFERENCE TO RELATED APPLICATIONS

This application claims foreign priority to and the benefit of European Patent Application No. EP17191474, filed Sep. 15, 2017, the entire disclosure of which is incorporated herein by reference.

FIELD

The present invention relates to a material rod feeding device for feeding material rods to a machine tool, which comprises a magazine for stocking the material rods and a guide means into which material rods to be processed can be fed from the magazine, one at a time, wherein a feeding direction of a material rod from the magazine into the guide means is transversely to the longitudinal axis of the material rod in the guide means, and also relates to a method for feeding material rods to a machine tool.

BACKGROUND

Such a generic device of the aforementioned type is known from EP 0 212 077 A2, and also from EP 2 316 611 B1, for example.

According to the disclosure of EP 2 316 611 B1, such devices are intended to feed material rods, one after the other, to a machine tool, such as a lathe, for example.

In this machine tool, these material rods are then processed thereby manufacturing particular individual components from these material rods.

For this purpose, the material rods are stocked in a magazine, from which they are fed into a guide. This guide then ensures the correct alignment of the material rod with regard to its longitudinal axis relative to the machine tool. This requires an adjustment in a direction transversely and usually also vertically relative to the feeding direction of the material rod from the magazine into the guide. Exact alignment is very important here, since the material rods are often set in rapid rotation in the machine tool. If the axis of rotation is not exactly on the central longitudinal axis of the material rod, this leads to imbalance and as a result to considerable damage.

The term "feeding direction" accordingly refers to the direction in which the material rods pass from the magazine into the guide, the feeding direction usually being perpendicular to the longitudinal axis of the material rod. Furthermore, depending on the desired product, material rods of different diameters are used, for example. For a reliable alignment of the central longitudinal axis of the material rod relative to the machine tool, a guide is therefore provided in EP 0 212 077 A2, which due to a design as a drum with holders of different sizes is able to accommodate material rods of different circular cross-sections.

Furthermore, it is apparent from EP 2 316 611 B1 that devices are also known from the prior art which are able to receive material rods in a guide having a V-shaped cross-sectional profile and thus achieve at least an alignment along the feeding direction of the material rods, provided the latter have a circular cross-sectional profile. In the case of other cross-sectional geometries, asymmetric positions are possible in the V-shaped cutout of the guide, in particular tilted positions. However, it has been found when using such machines, that the prior art guides of such devices only partially allow an optimum alignment of material rods with any possible, especially non-circular cross-sectional shapes.

For example material rods of quadrangular or hexagonal cross-sectional shapes, which are frequently used in addition to the circular profiles, often present problems. For example, devices according to EP 0 212 077 A2 are not suitable to be adapted to such non-circular cross-sectional shapes. A correct alignment of the material rods with their central longitudinal axis relative to the machine tool is therefore difficult or even impossible.

EP 2 316 611 B1 discloses an embodiment in which a material rod with substantially any cross-sectional shape can come to rest between a pair of limiters arranged on a rotatable disc and is alignable along a central axis defined by a plurality of such pairs of limiters by rotational movement of a series of such discs each provided with such pairs of limiters and arranged along a line.

However, in particular for feeding asymmetric profile shapes for which the position of the axis of gravity or the axis of rotation must be aligned flexibly and freely with the central axis of the rotating spindle of the machine tool, the previously known solutions are not suitable or only with components individually adapted to the respective profile shape. In the implementation according to EP 2 316 611 B1, a synchronous rotational movement of the discs is moreover always necessary, since otherwise, if two limiters arranged on a rotatable disc would engage on two outer positions of the material rod, the material rod could become blocked within the guide and as a result the entire rotating mechanism could become blocked and/or the material rod might become misaligned.

SUMMARY

The present invention is therefore based on the object to provide a guide for such a generic device mentioned in the introductory part, which allows to use material rods with cross-sectional shapes other than a circular geometry in one and the same device and to exactly feed them to a machine tool in any selectable central position.

With respect to the present invention, it should again be noted that, below, the term "feeding direction", unless otherwise stated, always refers to the direction in which the material rods pass from the magazine into the guide, and that this direction is usually perpendicular to the longitudinal axis of the material rod.

According to the invention, this object is achieved by the fact that the guide means comprise a support leg and an abutment leg for providing a variably modifiable receiving channel, the support leg providing a support surface of the receiving channel, which is inclined in the feeding direction and relative to the horizontal, and the abutment leg being movable along the inclination relative to the support leg, so that the variably modifiable receiving channel can be provided between the two legs, into which the material rod to be processed can be fed onto the support surface, and wherein the support leg can be moved vertically together with the abutment leg, as a whole.

With the receiving channel that can be formed by the two legs and which is inclined and adjustable along at least two axes, the device of the invention thus provides for an adaptation of the guide means to individual cross-sectional widths and shapes, especially also to non-circular cross-sectional shapes of the material rods. Furthermore, the adjustability of the legs of the receiving channel provides in a most simple way for alignability of the material rod of substantially any cross-sectional shape in any position, always correctly and exactly within the guide means along a central longitudinal line of the guide means.

Furthermore, if according to one embodiment the inclined support leg provides a slope in the feeding direction and relative to the horizontal, it is possible for a material rod to be fed from the magazine to the guide means solely by means of the movable abutment leg by virtue of gravity. Hence, the material rod may be transferred from the magazine to the guide means even without an additional mechanism. The movable abutment leg here moreover provides the advantage that the material rod is prevented from skipping or rolling over and beyond the guide means, since the movable abutment leg even allows to control the rate of motion of the material rods.

A further preferred embodiment furthermore provides for individual movability of one or both legs of the receiving channel formed thereby, also at a distance transversely to the feeding direction in each case. This provides an additional improvement of reliability and simplicity in aligning the material rod of essentially any cross-sectional shape correctly and exactly within the guide means with respect to the machine tool. In practical implementation, at least two drives are preferably provided for this purpose spaced apart from each other transversely to the feeding direction, to provide for relative movability of the single abutment leg, and/or at least two drives are provided spaced apart transversely to the feeding direction to provide for vertical movability.

In a further embodiment of the invention, the single support leg and/or the single abutment leg is formed by a plurality of segment-like leg members that are arranged spaced apart from each other transversely to the feeding direction.

This has the advantage that it represents the constructive minimum for the support surfaces in this case in order to achieve a reliable alignment of the material rod, in particular if each segment-like leg member suitably has a drive associated therewith, so as to be movable.

In a further embodiment of the invention, the support leg and/or the abutment leg is formed as a continuous leg along the entire receiving channel. In contrast to a prior art device as for instance known from EP 2 316 611 B1, the solution according to the invention is therefore not limited to a segmented design of a guide for the material rod, which further has the advantage that even short rod portions can be fed to the machine tool in reliable manner.

In a further embodiment of the invention, at least one electromechanical drive or electromechanical adjustment means is provided for movability of the legs.

An electromechanical drive or electromechanical adjustment means offers the advantage that a leg moved thereby can be positioned in any desired position along a central axis in a most simple way.

In a further embodiment of the invention, at least one pneumatic actuator and at least one adjustable stop is provided for movability of the legs. A leg displaced by an actuator can thus be driven against a stop for being positioned in a variable desired final position in order to achieve a reliable alignment of the material rod.

A significant advantage of using a pneumatic actuator with a stop for adjustment is that this is a cost-effective alternative to the electromechanical adjustment.

In a further embodiment of the invention, an inclination of the abutment leg is adjustable in the feeding direction and relative to the vertical, and/or at least the support leg is modifiable in its inclination. These embodiments offer the advantage that in this case the angle between the legs defining the receiving channel is also adjustable, and consequently the receiving channel can again more effectively be adapted to the sliding behavior of the material rods to be processed, which is determined by the geometry and surface finish thereof.

According to a further embodiment of the invention, it is intended to first separate the material rods coming from the magazine using a separating device, and then directly feed them into the receiving channel.

This embodiment has the advantage that the material rods can be transferred onto the guide in separated manner, so that a displacement and the associated alignment of the abutment leg has to be performed less frequently and in particular not in each feeding cycle, thereby shortening the auxiliary processing time.

In a further embodiment of the invention, a lifting frame can be connected to the legs. As a result, the movable legs can also be used to lift the material rods stocked in the magazine into the receiving channel using such a lifting frame.

A particular advantage of this embodiment is that the feeding of the material rods can be achieved in substantially any position and the subsequent aligning of the material rod relative to the machine tool can be achieved independently of gravity.

Another aspect of the present invention includes a preferred method for feeding material rods to a machine tool according to the preceding embodiments, the method comprising the following steps:

Discharging a material rod from a magazine onto an inclined support leg, in particular by exploiting gravity, while moving an abutment leg along the inclination relative to the support leg, so that a variably modifiable receiving channel is formed between the two legs, in which the material rod is received; lifting the receiving channel together with the material rod therein and simultaneously preventing the stocked material rods from following behind by slipping; aligning the material rod in the desired position relative to the machine tool.

It will be appreciated that the features as mentioned above and explained below can be employed not only in the particular combination mentioned, but also in other combinations and also alone, without departing from the scope of the present invention.

BRIEF DESCRIPTION OF THE DRAWINGS

The invention will now be described and explained in more detail by way of some selected exemplary embodiments in conjunction with the accompanying drawings, wherein.

DETAILED DESCRIPTION

Figure 1:
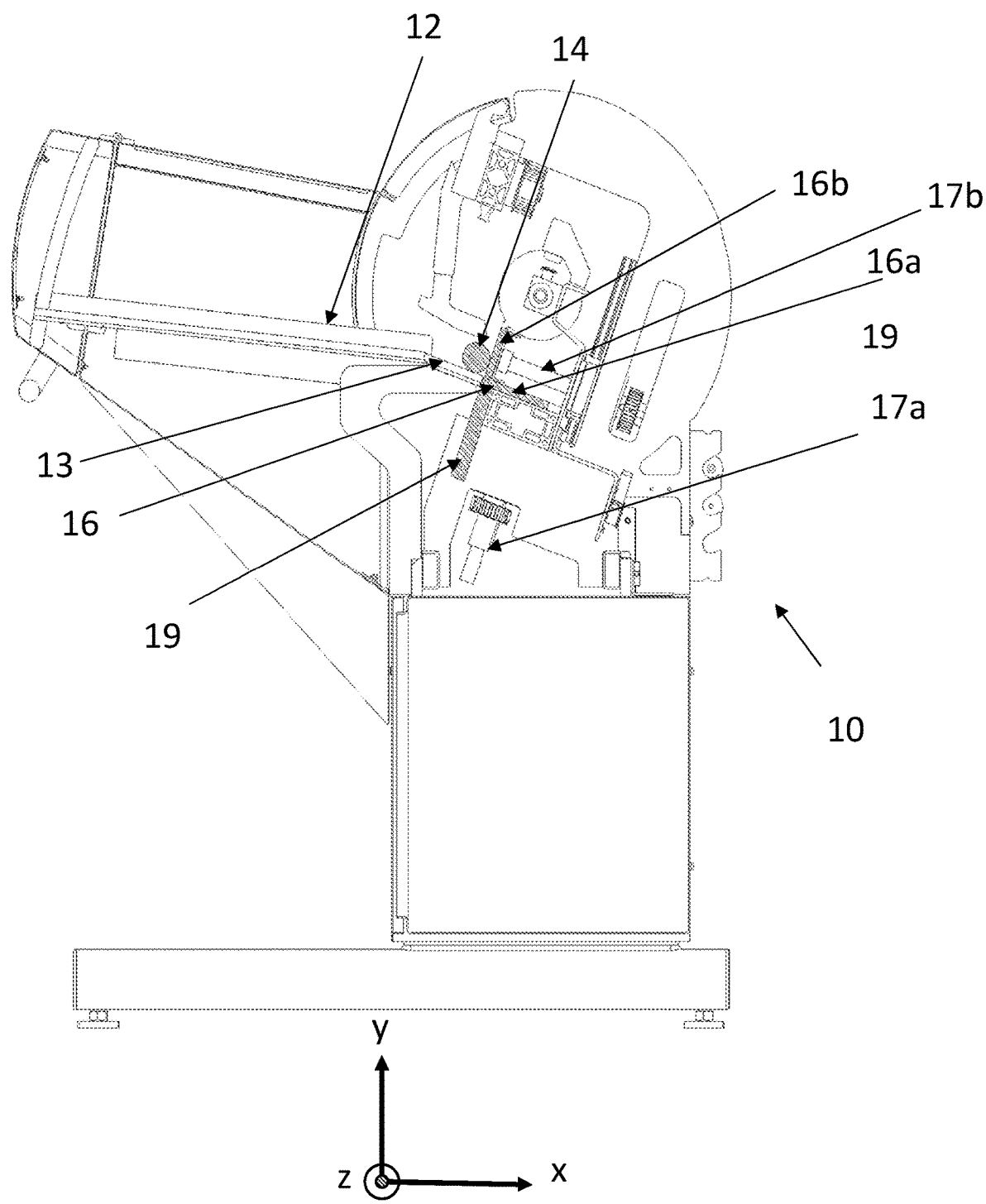
FIG. 1 shows an embodiment of a material rod feeding device according to the invention in a sectional side view.

An embodiment of a material rod feeding device according to the invention as shown in its entirety in a sectional side view in FIG. 1 is denoted by reference numeral 10.

Material rod feeding device 10 is configured for feeding material rods 14 to a machine tool that is not further shown for reasons of clarity, such as a lathe, for example, and comprises a magazine 12 for stocking the material rods 14 and a guide means 16 for these material rods, which comprises a support leg 16a and an abutment leg 16b, which will be described in more detail in conjunction with the other figures. For reasons of clarity, only one material rod 14 is illustrated in FIG. 1, which is fed from the magazine 12 into the guide means 16 for subsequent processing. As can be seen from FIG. 1, the feeding direction of a material rod from the magazine into the guide means is transversely to the longitudinal axis of the material rod 14 in the guide means 16. For example, according to the coordinate cross shown in FIG. 1, the feeding substantially occurs in the x-direction, while the longitudinal axis of the material rod 14 substantially extends in the z-direction.

Figure 2:
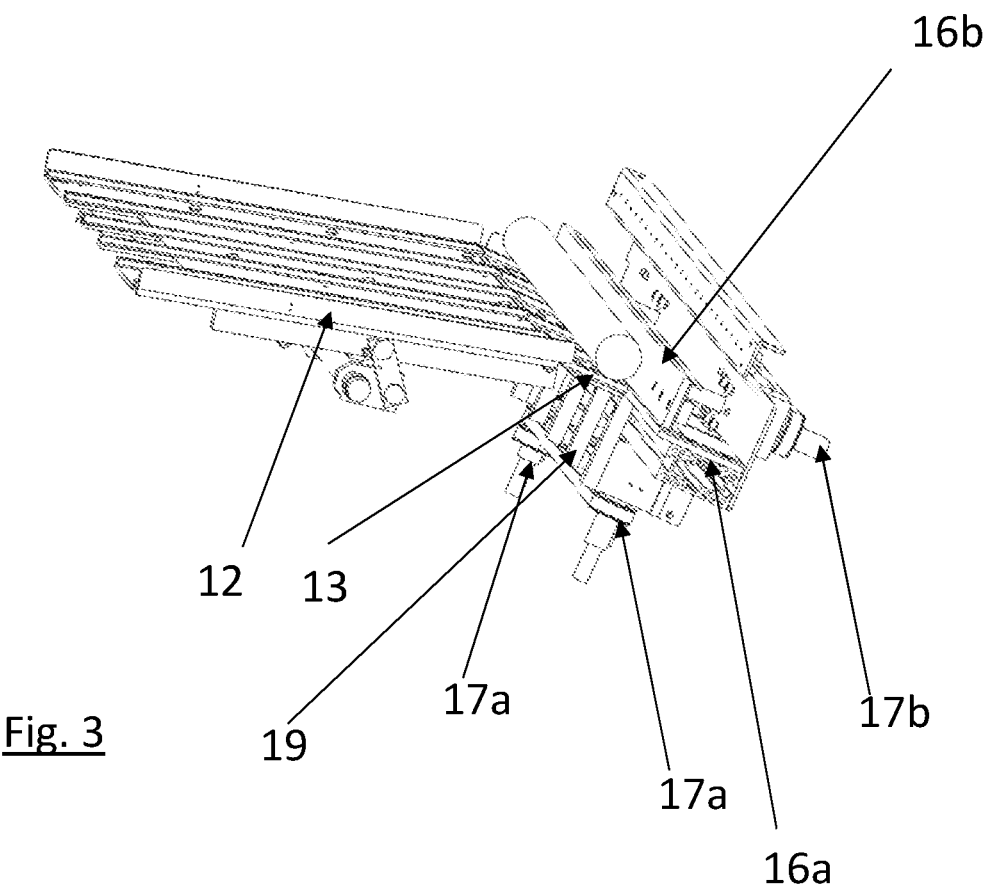
FIG. 2 is a fragmentary perspective view of a magazine and a guide means of the device of FIG. 1.

Furthermore, as can be seen in detail in conjunction with the view of FIG. 1 but also with the view of FIG. 2, a kind of ramp 13 may be arranged in the feeding area or transition area from the magazine 12 to the guide 16. Alternatively, depending on the specific embodiment, such a separate ramp 13 may also be dispensed with, or it may be provided as part of the magazine 12, so that in these cases the guide means 16 will adjoin the magazine 12.

Figure 3:
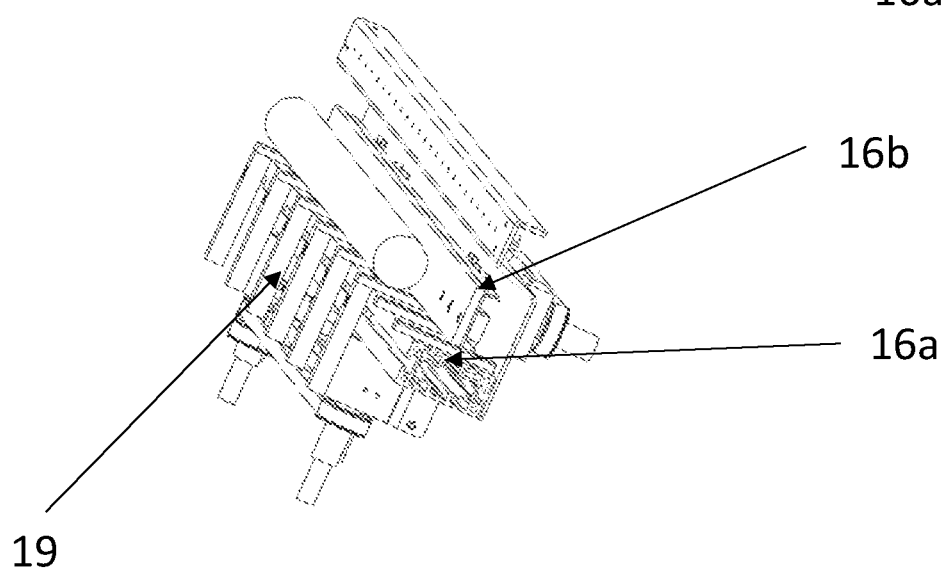
FIG. 3 is a further fragmentary perspective detailed view of the guide means of FIG. 2.

Additionally referring to the view of FIG. 3, it can further be seen that the abutment leg 16b, viewed in cross-section, extends substantially from the support leg 16a in the y-direction. However, the abutment leg 16b may be inclined relative to the vertical in this case.

Furthermore, in an appropriate implementation, the embodiment of a guide means shown in the figures has stops 19 distributed along the length thereof, which when viewed in cross-section extend from the support leg 16a into a direction relative to the abutment leg 16b which is substantially opposite to the abutment leg 16b, and thus extend away from an underside of the support leg 16a.

The support leg 16a takes a position inclined in the feeding direction and relative to the horizontal when viewed in cross-section, and provides a correspondingly inclined support surface for a material rod 14 to be processed. As will further be explained below in particular with reference to FIGS. 4a to 4d, the inclined support leg 16a suitably provides a slope in the direction of feeding and relative to the horizontal.

The abutment leg 16b, in turn, is movable along the inclination relative to the support leg 16a, as can already be seen from a comparison of the views of FIGS. 2 and 3, so that a variably modifiable receiving channel can be provided between the two legs 16a and 16b, into which the material rod to be processed can be fed onto the inclined support surface. Finally, the support leg 16a can in turn be moved together with the abutment leg 16b as a whole, namely vertically, as will be described in more detail below, in particular with reference to FIGS. 4a to 4d.

For moving the abutment leg 16b and the support leg 16a, that is to say the support leg 16a together with the abutment leg 16b, respective suitable drives 17b and 17a are provided and are schematically illustrated in the views. In practical implementation, a respective drive 17a, 17b provided for movability can be implemented as an electromechanical drive, for example. An implementation as a pneumatic actuator with at least one adjustable stop is however also suitable.

Due to the inclined arrangement of the support leg 16a relative to the horizontal and the movability of the abutment leg 16b along the inclination and relative to the support leg 16a, the receiving channel into which the material rod to be processed is fed and which is variably modifiable as a result, takes the form of an inclined L-shaped channel (see FIG. 3). It should be noted that due to the selected sectional view the "L" can be seen in a mirrored orientation or a lying orientation.

The abutment leg 16b also defines a lateral limiter with regard to the receiving channel, and the support leg 16a thus defines the supporting surface, i.e. the bottom of the receiving channel, on which the material rod to be processed comes to rest in the guide means.

The support and abutment legs may furthermore each be defined by a plurality of segment-like leg members that are arranged spaced apart from each other perpendicular to the feeding direction, as can be seen from FIG. 3 with respect to the single support leg 16a, or may else be implemented as a continuous leg along the entire receiving channel, as can be seen from FIG. 3 with respect to the single abutment leg 16b.

In the embodiment illustrated in FIGS. 2 and 3, both the plurality of segment-like spaced-apart leg members defining the support leg 16a and the continuous abutment leg 16b can each be moved by two respective drives 17a and 17b, which are spaced apart perpendicularly to the feeding direction, although only one of the drives 17b can be seen in the figures.

Due to the individual movability of the support leg 16a at a distance perpendicular to the feeding direction and/or the individual movability of the abutment leg 16b at a distance perpendicular to the feeding direction, the support leg 16a may also take different positions along the guide means in the vertical direction, or the abutment leg 16b may also take different positions along the guide means at a distance from the magazine. Depending on the embodiment and the material rods to be fed, it may as well be suitable in the case of a segment-like configuration of one or both legs, to have an own drive associated with each segment-like leg member for movability thereof.

In this respect, it may also be appropriate, alternatively or additionally, that in particular the support leg 16a is variable in its inclination, i.e. along the guide means and/or also relative to the horizontal in the feeding direction. However, depending on the cross-sectional shape of the material rods, the inclination of the abutment leg 16b may also be adjustable in the feeding direction and relative to the vertical.

It should be noted, however, that in principle, depending on the specific configuration or specific application, it may also be sufficient to provide at least one drive 17b for relative movability of the at least one abutment leg 16b and at least one drive 17a for vertical movability.

In conjunction with FIGS. 4a to 4d, the operation of a material rod feeding device according to the invention will now be discussed in more detail, although merely by way of example.

Figure 4A:
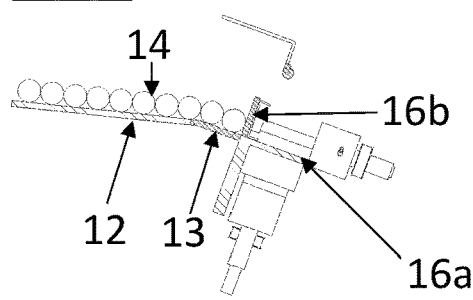
FIGS. 4a to 4g are fragmentary partially sectional side views of the magazine and the guide means according to FIGS. 2 to 3 in respective different positions according to a process sequence of the invention.

FIG. 4a shows an exemplary initial position of both the support leg 16a and the abutment leg 16b. A plurality of material rods 14 with circular cross-sections, for example, is stocked in magazine 12. The foremost material rod in the magazine with respect to the guide means is abutting on the abutment leg 16b, for example, which has not yet been moved to form a receiving channel. Depending on the particular arrangement of the magazine relative to the guide means, such abutment may be a result of gravity and a slope provided between the magazine 12 and the guide means, and/or of the pressure exerted by the subsequent material rods stockpiled in the magazine. Here, the support leg is suitably in an initial position in which the inclined support surface of the receiving channel provided by the support leg 16a essentially provides a stepless transition to the magazine or else to a ramp provided on the magazine.

Figure 4B:
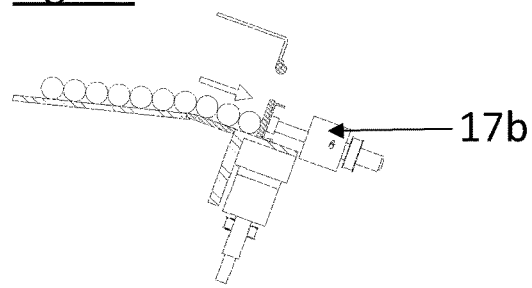

In order to transfer the foremost material rod 14 onto the guide, the abutment leg 16b is retracted using one or more drive(s) associated with the abutment leg 16b, as illustrated in FIG. 4b, and is therefore moved along the inclination relative to the support leg 16a to such an extent that the material rod to be processed comes to rest in the receiving channel formed thereby, but the following material rods remain in front of the guide means.

Figure 4C:
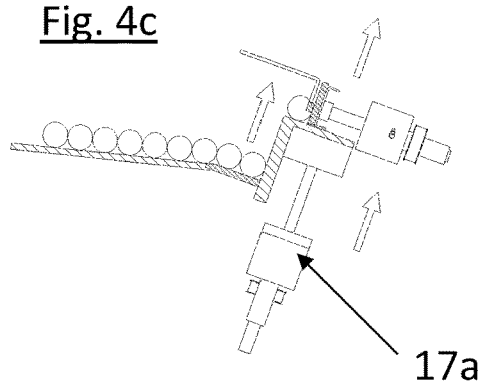

In FIG. 4c it can be seen that, as the next step, the support leg 16a is moved vertically, and thus together with the abutment leg 16b as a whole. Hereby, the material rod to be processed can be altered in its height level position relative to the machine tool and can thus be aligned.

Furthermore, it can be seen that the stops 19 on the guide means are suitable for preventing further material rods from following by rolling behind. It should be noted, however, that other measures can also be used to prevent further material rods from undesirably following behind by rolling or by otherwise being urged or slipping into the guide means, for example by a magazine with adjustable tilt angle or which is movable in height level.

Figure 4D:
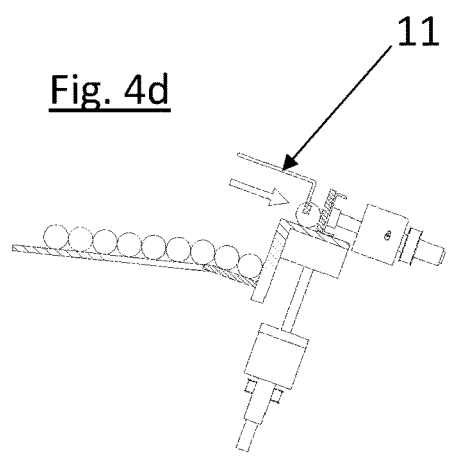
Figure 4E:
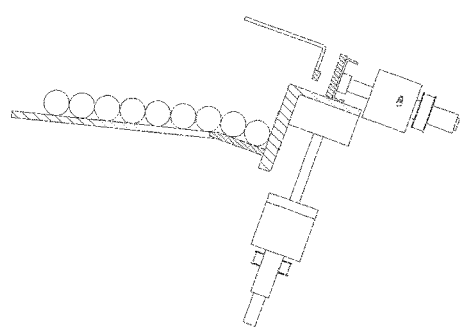

As the next step, it can be seen in FIG. 4d that the material rod lying on the support surface is changed in its position by further moving the abutment leg 16b laterally until the material rod is aligned exactly, preferably in any desired selectable centered position with respect to the machine tool. Subsequently, the material rod can be advanced towards the machine tool by an advancing means 11, so that, as a result, there is no material rod visible anymore lying in the receiving channel in FIG. 4e.

Figure 4F:
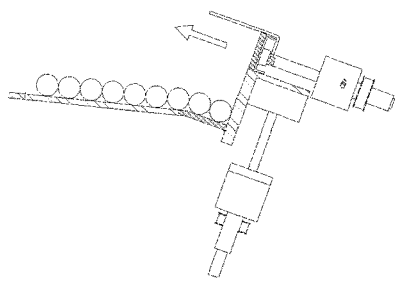
Figure 4G:
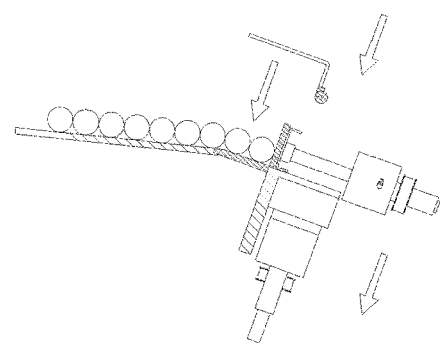

Once the feeding of the material rod to the machine tool has been completed, first the abutment leg 16b and subsequently also the support leg 16a can be returned into their initial positions by respective drives 17b and 17a, respectively, according to FIG. 4f.

Then, another feed cycle can again be started.

Furthermore, it can be seen that the guide means, when driven into such initial position, again prevents material rods from continuously rolling into the receiving channel to be formed, thereby counteracting uncontrollable motion sequences of the material rods during feeding.

FIGS. 5a to 5d schematically show different tool bar profiles, for illustration purposes, each one individually aligned along a central longitudinal line of the guide means according to the invention in any desired but defined position in a receiving channel appropriately formed and positioned.

Figure 5A:
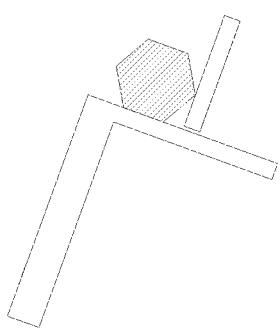
FIGS. 5a to 5d are schematic views of different material rod profile shapes, aligned along a central longitudinal line of the guide means according to the invention in each case, in any desired but defined position.
Figure 5B:
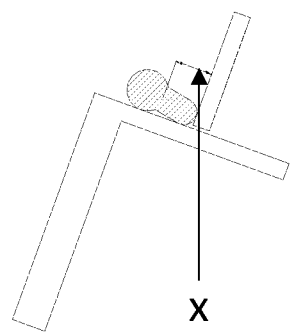
Figure 5C:
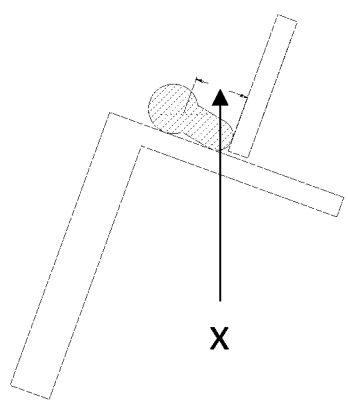
Figure 5D:
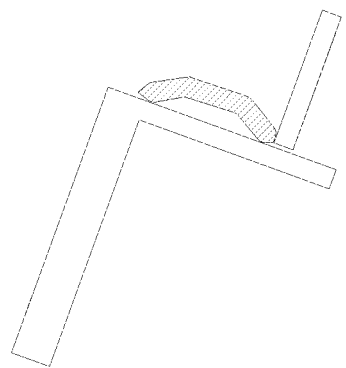

Consequently, the material rod feeding device according to the invention permits to precisely and individually align material rods which have a standard hexagonal profile (FIG. 5a) instead of a circular profile, for example, or else a lock profile (FIGS. 5b and 5c). In the case of a lock profile or else another profile with an eccentric center of gravity, the device according to the invention, due to its receiving channel that is variably adjustable and can be variably positioned, offers the possibility of exact alignment of the material rod with respect to the machine tool in the center of the circumference of the material rod cross-section (see FIG. 5b), in the center of gravity of the profile (see FIG. 5c), or in any other desired position x, as illustrated in FIGS. 5b and 5c by the double arrow denoted by x as a measure between the abutment leg and the desired alignment point. Feeding and individual variable alignment of a material bar that has an arbitrarily shaped profile (see FIG. 5d) is, of course, possible as well.

In particular it can be seen from FIGS. 5a to 5d, that due to the inclination, in particular the adjustable inclination of the support surface provided by support leg 16a, and due to the only single abutment leg 16b, which therefore limits the support surface only on one side, centering and aligning is possible in an extremely flexible manner, since the material rod is always centered in the receiving channel defined by the guide means, but not by two opposite walls, as is the case in EP 2 316 611 B1 due to the two limiters.

FIG. 6 again shows a perspective view illustrating an exemplary position of the guide means for feeding a material rod to the machine tool, in which a material rod has already been fed into a receiving channel formed by support legs 16a and abutment leg 16b, preferably already exactly aligned for being fed into a machine tool, and a further material rod not yet fed into the guide means is retained in the magazine 12 or on a ramp 13.

Figure 7:
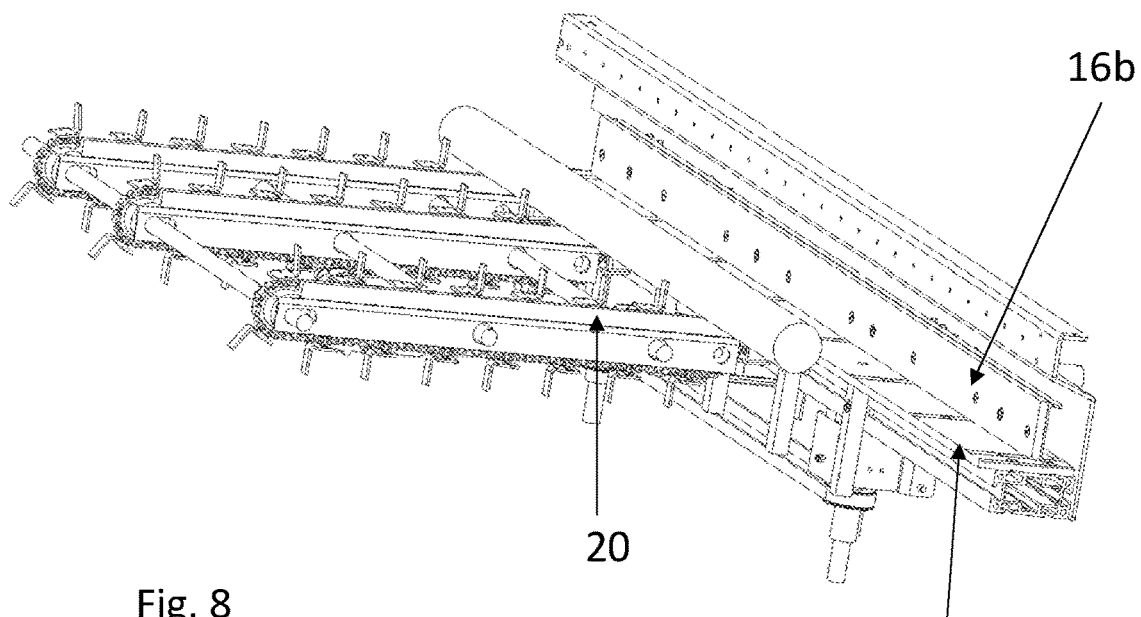
FIG. 7 shows a further fragmentary perspective view of a guide means with a separating device arranged on the side of the magazine which is not further illustrated for reasons of clarity.

Although controlled feeding of a material rod to be processed from the magazine 12 into the receiving channel that is defined between the two legs 16a and 16b in variably modifiable manner may be achieved in controlled manner solely by individually moving the abutment leg 16b and the support leg 16a according to the procedure described above by way of example, it is however also possible, as an alternative, to provide a separating device 20 on the side of the magazine, as can be seen in the embodiment of FIG. 7. In this way it is in particular possible to reduce the holding time between two feed cycles, since at least the abutment leg 16b does not always have to be moved into an initial position between two cycles, as described above, in order to effectively prevent further material rods from following behind by rolling, being urged, or slipping.

Figure 8:
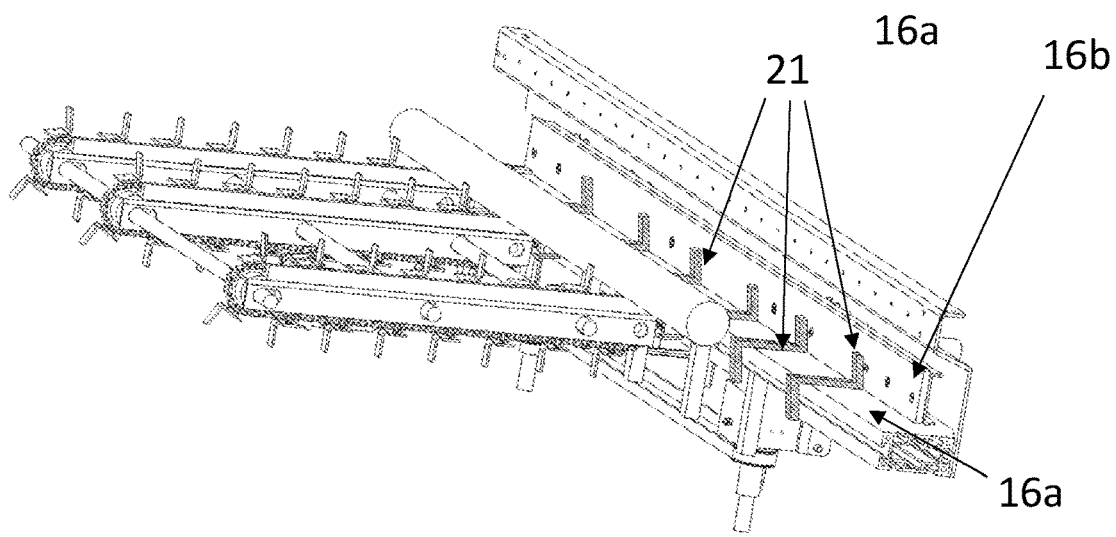
FIG. 8 shows a further fragmentary perspective view of a guide means with a lifting frame connected to the legs for lifting the material rod from a magazine into the receiving channel.

FIG. 8 schematically illustrates an embodiment in which, in addition to the separating device 20 according to the embodiment of FIG. 7, a lifting frame 21 is connected to the legs. Such lifting frame or a similar one is in particular firmly mounted to the abutment leg 16b, so that with the movability of both legs according to the invention the material rods stocked on the magazine can be lifted into the receiving channel in a controlled manner. It should be pointed out that, depending on the specific design of the magazine and/or of the lifting frame 21, a separating device as schematically illustrated in FIG. 8 may as well be dispensed with.

Figure 6:
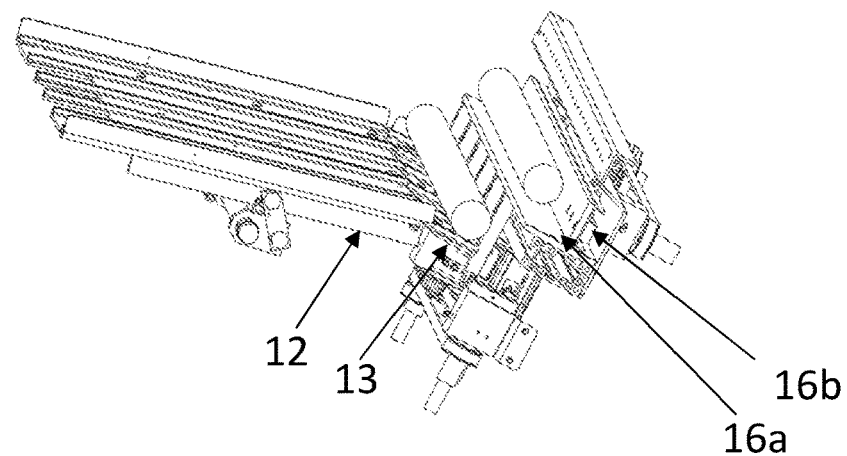
FIG. 6 is a further fragmentary perspective view of a guide means according to the invention showing a material rod aligned for being fed into a machine tool and another material rod not yet supplied to the guide means.

It should also be noted that in the views of FIGS. 6, 7, and 8, both legs, i.e. support leg 16a and abutment leg 16b, are shown in the form of continuous legs.

In summary, the material rod feeding device according to the invention thus permits to discharge a material rod from a magazine onto an inclined support leg, in particular by virtue of gravity, while an abutment leg is moved along the inclination relative to the support leg, so that a variably modifiable receiving channel is formed between the two legs, in which the material rod is received, to raise the receiving channel together with the material rod received therein and at the same time to prevent subsequent stockpiled material rods from following behind by rolling, slipping or being urged, and to subsequently align the material rod in the desired position relative to the machine tool.

This method is advantageous due to the fact that an orientation of the material rod, in particular in the feeding direction, is not predefined by design configurations as known from the prior art and discussed above, but is determined in dependence of the shape and cross-sectional profile of the material rod by a single abutment leg that is movable along the inclination of and relative to the support leg, and by the support leg that is vertically movable together with the abutment leg. Particularly advantageously, the two legs can be moved individually by at least one drive.

LIST OF REFERENCE NUMERALS

10 Material rod feeding device
11 Advancing means
12 Magazine
13 Ramp
14 Material rods
16 Guide means
16a Support leg of guide means
16b Abutment leg of guide means
17a Drives for moving the support leg together with the abutment leg
17b Drives for moving the abutment leg
19 Stops
20 Separating device
21 Lifting frame
x Measure for desired alignment point

What is claimed is:

1. A material rod feeding device for feeding material rods to a machine tool, comprising: a magazine for stocking the material rods, and a guide means into which material rods to be processed can be fed from the magazine, one at a time, wherein a feeding direction of a material rod from the magazine into the guide means is transversely to the longitudinal axis of the material rod in the guide means; wherein: the guide means comprises a support leg and an abutment leg, wherein the support leg provides a support surface, which is inclined in the feeding direction and relative to the horizontal, wherein the abutment leg is movable along the inclination relative to the support leg, so that a variably modifiable receiving channel is formed between the support leg and the abutment leg, into which the material rod to be processed can be fed onto the support surface, and wherein the support leg together with the abutment leg is vertically movable as a whole.

2. The material rod feeding device according to claim 1, wherein the inclined support leg provides a slope in the feeding direction and relative to the horizontal.

3. The material rod feeding device according to claim 1, further comprising at least one drive for providing relative movability of the single abutment leg and at least one drive for providing vertical movability.

4. The material rod feeding device according to claim 1, wherein the single support leg and/or the single abutment leg is individually movable at a respective distance transversely to the feeding direction.

5. The material rod feeding device according to claim 1, further comprising at least two drives spaced apart transversely to the feeding direction for providing relative movability of the single abutment leg, and/or at least two drives spaced apart transversely to the feeding direction for providing vertical movability.

6. The material rod feeding device according to claim 1, wherein the single support leg and/or the single abutment leg is formed by a respective plurality of segment-like leg members that are arranged spaced apart from each other transversely to the feeding direction.

7. The material rod feeding device according to claim 6, wherein each segment-like leg member has associated therewith a drive for providing movability thereof.

8. The material rod feeding device according to claim 1, wherein the support leg and/or the abutment leg is formed as a continuous leg along the entire receiving channel.

9. The material rod feeding device according to claim 1, wherein at least one electromechanical drive is provided for movability.

10. The material rod feeding device according to claim 1, wherein at least one pneumatic actuator and at least one adjustable stop is provided for movability.

11. The material rod feeding device according to claim 1, wherein at least the support leg is modifiable in its inclination.

12. The material rod feeding device according to claim 1, wherein an inclination of the abutment leg is adjustable in the feeding direction and relative to the vertical.

13. The material rod feeding device according to claim 1, further comprising a separating device arranged at the side of the magazine, the separating device adapted to separate the material rod to be processed from the material rods stocked with the magazine and feed the material rod to be processed directly into the receiving channel.

14. The material rod feeding device according to claim 1, further comprising a lifting frame connected to the abutment leg, the lifting frame for lifting the material rod stocked on the magazine into the receiving channel.

\* \* \* \* \*